(12) United States Patent
Yoshida et al.

(10) Patent No.: US 10,928,518 B2
(45) Date of Patent: Feb. 23, 2021

(54) RANGE IMAGE GENERATION APPARATUS AND RANGE IMAGE GENERATION METHOD

(71) Applicant: HITACHI-LG DATA STORAGE, INC., Tokyo (JP)

(72) Inventors: Daisuke Yoshida, Tokyo (JP); Yuuichi Nonaka, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/094,901

(22) PCT Filed: Apr. 19, 2016

(86) PCT No.: PCT/JP2016/062419
§ 371 (c)(1),
(2) Date: Oct. 19, 2018

(87) PCT Pub. No.: WO2017/183114
PCT Pub. Date: Oct. 26, 2017

(65) Prior Publication Data
US 2019/0129034 A1 May 2, 2019

(51) Int. Cl.
*G01S 17/36* (2006.01)
*G01S 17/89* (2020.01)
*G01S 17/10* (2020.01)
*H04N 5/235* (2006.01)
*G01S 17/18* (2020.01)
(Continued)

(52) U.S. Cl.
CPC ............ *G01S 17/36* (2013.01); *G01S 7/4802* (2013.01); *G01S 17/10* (2013.01); *G01S 17/18* (2020.01); *G01S 17/89* (2013.01); *H04N 5/2256* (2013.01); *H04N 5/2354* (2013.01)

(58) Field of Classification Search
None
See application file for complete search history.

(56) References Cited

U.S. PATENT DOCUMENTS

2003/0117412 A1  6/2003  Brooksby et al.
2011/0063437 A1  3/2011  Watanabe et al.
(Continued)

FOREIGN PATENT DOCUMENTS

| JP | 2002-101347 A | 4/2002 |
| JP | 2007-271373 A | 10/2007 |
| JP | 2010-025906 A | 2/2010 |

(Continued)

OTHER PUBLICATIONS

Japanese Office Action dated Feb. 25, 2020 for the Japanese Patent Application No. 2018-512687.

*Primary Examiner* — Kate H Luo
(74) *Attorney, Agent, or Firm* — Volpe Koenig

(57) ABSTRACT

It is possible to generate a range image with higher accuracy. A range image generation apparatus includes: a light emitting unit that emits light toward an object at different light emission intensities; a light receiving unit that captures an image of the object by receiving light including reflected light from the object and calculates a light exposure amount for each pixel; and a range calculating unit that calculates a range to the object by replacing a light exposure amount at a first light emission intensity by a light exposure amount at a second light emission intensity in a predetermined case and generates a range image.

10 Claims, 11 Drawing Sheets

(51) Int. Cl.
    *G01S 7/48*     (2006.01)
    *H04N 5/225*     (2006.01)

(56) References Cited

U.S. PATENT DOCUMENTS

| 2016/0178734 A1 | 6/2016 | Kawamura et al. |
| 2016/0320486 A1 | 11/2016 | Murai et al. |

FOREIGN PATENT DOCUMENTS

| JP | 2012-220285 A | 11/2012 |
| JP | 2012-225807 A | 11/2012 |
| JP | 2016-040520 A | 3/2016 |
| WO | 2010/021090 A1 | 2/2010 |
| WO | 2014/207983 A1 | 12/2014 |
| WO | 2015/107869 A1 | 7/2015 |

RANGE IMAGE GENERATION APPARATUS AND RANGE IMAGE GENERATION METHOD

TECHNICAL FIELD

The present invention relates to a range image generation apparatus and a range image generation method.

BACKGROUND ART

PTL1 discloses the following contents. When a range image showing a range to a target object present in a target space is estimated by a time-of-flight (TOF) method, if it is intended to realize an increase in a resolution of the range image or an increase in a frame rate of the range image, there is a risk that charged coupled device (CCD) saturation will occur and range accuracy will be decreased due to an influence of shot noise, ambient light, or the like. A light emission frequency selecting unit (7) receives reflected light S2 from the target object at a point in time in which light is not emitted from a light source and selects illumination light S1 having a light emission frequency hard to be influenced by the ambient light based on a frequency analysis of the reflected light S2. An image creating unit (6) receives reflected light of the illumination light S1 having this optimal light emission frequency and emitted from a prepared light source and creates the range to the target object, such that it is possible to suppress the influence of the ambient light at the time of receiving the light and it is thus possible to decrease an influence of noise on range accuracy when a resolution of the light receiving element unit (2) is increased.

CITATION LIST

Patent Literature

[Patent Literature 1] WO 2010/021090 A

SUMMARY OF INVENTION

Technical Problem

In recent years, the need for accurately grasping an object or a situation around the object in various fields such as a digital signage, a game, an autonomous mobile robot, an automobile, and security has increased. Therefore, approaches to increasing accuracy of object recognition using a so-called range image that two-dimensionally expresses a range to the object in addition to an image acquired by a camera have increased. There are a plurality of three-dimensional recognition techniques (methods) using the range image, but in a time-of-flight (TOF) method, a camera and a projector are controlled in combination, and a time until light projected by the projector is reflected on a target object and then returns is measured in real time for each pixel. According to this method, as compared with other three-dimensional recognition techniques such as a stereo image processing method, there is an advantage that it is hard to be influenced by a change in ambient light, a change in a temperature, and the like, or it is possible to measure a range with high accuracy and in real time.

On the other hand, in the TOF method, since near infrared light is generally used, in an environment where the near infrared light is extremely strong (for example, the outdoors when the sun shines) or an object having gloss on a surface of a metal or the like, a signal obtained by exposing light by an image sensor is saturated, such that accurate range information can not be acquired. In a technique of Patent Literature 1, it is described to suppress saturation of the image sensor by estimating the light emission frequency hard to be influenced by the ambient light and changing a frequency of illumination. However, according to the technique of Patent Literature 1, in the case of an object having a high light reflectivity, for example, in the case in which an object surface has a mirror surface shape, the saturation of the image sensor can not be suppressed, and range accuracy can not be improved.

Therefore, an object of the present invention is to provide a range image generation apparatus capable of generating a range image with higher accuracy.

Solution to Problem

The present application includes a plurality of means that solve at least some of the abovementioned problems, and an example of these means is as follows.

To solve the abovementioned problems, a range image generation apparatus according to the present invention includes: a light emitting unit that emits light toward an object at different light emission intensities; a light receiving unit that captures an image of the object by receiving light including reflected light from the object and calculates a light exposure amount for each pixel; and a range calculating unit that calculates a range to the object by replacing a light exposure amount at a first light emission intensity by a light exposure amount at a second light emission intensity in a predetermined case and generates a range image.

Advantageous Effects of Invention

According to the range image generation apparatus according to the present invention, it is possible to generate a range image with higher accuracy. It should be noted that objects, configurations, and effects other than those described above will be clarified from a description of embodiments provided below.

DESCRIPTION OF EMBODIMENTS

Hereinafter, a range image generation apparatus according to a first embodiment of the present invention will be described.

First Embodiment

Figure 1:
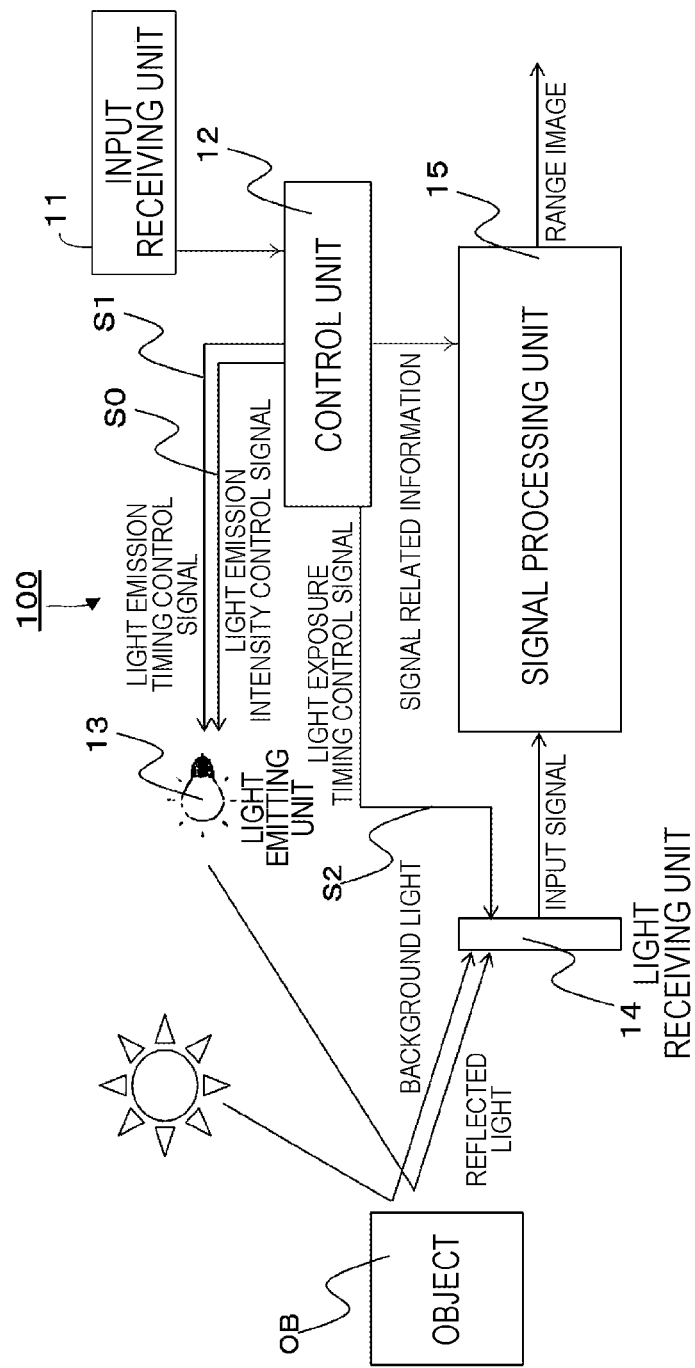
FIG. 1 is a diagram showing an example of a schematic configuration of a range image generation apparatus according to a first embodiment of the present invention.

FIG. 1 is a diagram showing an example of a schematic configuration of a range image generation apparatus 100 according to the present embodiment. The range image generation apparatus 100 adopts a time-of-flight (TOF) method, and is an apparatus that generates a range image in which a range to an object OB is two-dimensionally arranged for each pixel. Specifically, the range image generation apparatus 100 includes an input receiving unit 11, a control unit 12, a light emitting unit 13, a light receiving unit 14, and a signal processing unit 15.

The input receiving unit 11 is a functional unit that receives an instruction input from a user of the range image generation apparatus 100. Specifically, the input receiving unit 11 receives setting of a predetermined image capturing mode (for example, a short range mode, a medium range mode, a long range mode, or the like) related to a measurement range (for example, 1 to 3 m (short measurement range), 3 to 7 m (middle measurement range), 7 to 10 m (long measurement range), or the like) from the range image generation apparatus 100 to the object OB from the user. In addition, the input receiving unit 11 outputs the received setting information to a predetermined functional unit (for example, the control unit 12 or the like).

The control unit 12 is a functional unit that controls various processes executed by the range image generation apparatus 100. Specifically, the control unit 12 generates a light emission intensity control signal S0, a light emission timing control signal S1, and a light exposure timing control signal S2 depending on the measurement range. It should be noted that the light emission intensity control signal S0 is a signal that controls a degree of strength of light emission (light emission intensity) in the light emitting unit 13. In addition, the light emission timing control signal S1 is a signal that controls a timing of light emission by the light emitting unit 13 and a length of a light emission time. In addition, the light exposure timing control signal S2 is a signal that controls a timing of light exposure by the light receiving unit 14 and a length of a light exposure time.

The control unit 12 outputs the light emission intensity control signal S0 and the light emission timing control signal S1 to the light emitting unit 13 and outputs the light exposure timing control signal S2 to the light receiving unit 14, at a predetermined timing (for example, when a generation instruction of a range image by image-capturing of the object OB is received from the user). In addition, the control unit 12 generates information (hereinafter, referred to as signal related information) on the timing indicated by these control signals, and outputs the information to the signal processing unit 15.

The light emitting unit 13 is a functional unit that emits near infrared light toward the object OB. Specifically, the light emitting unit 13 emits the near infrared light toward the object OB at a timing and a light emission intensity indicated by the light emission timing control signal S1 and the light emission intensity control signal S0.

The light receiving unit 14 is a functional unit that receives light including reflected light of the light with which the object OB is irradiated and calculates a light exposure amount. Specifically, the light receiving unit 14 captures an image of the object OB by receiving (exposing) light including reflected light from the object OB at a timing indicated by the light exposure timing control signal S2. In addition, the light receiving unit 14 calculates a light exposure amount for each pixel of the captured image of the object. In addition, the light receiving unit 14 converts the light exposure amount into an electrical signal by photoelectric conversion, and outputs the converted electrical signal to the signal processing unit 15.

The signal processing unit 15 is a functional unit that calculates a range to the object OB for each pixel and generates a range image. Specifically, the signal processing unit 15 acquires the photoelectrically converted electrical signal as an input signal from the light receiving unit 14, and calculates the range to the object OB for each pixel using the electrical signal. In addition, the signal processing unit 15 generates a range image in which each pixel having range information to the object OB is two-dimensionally arranged.

Figure 2:
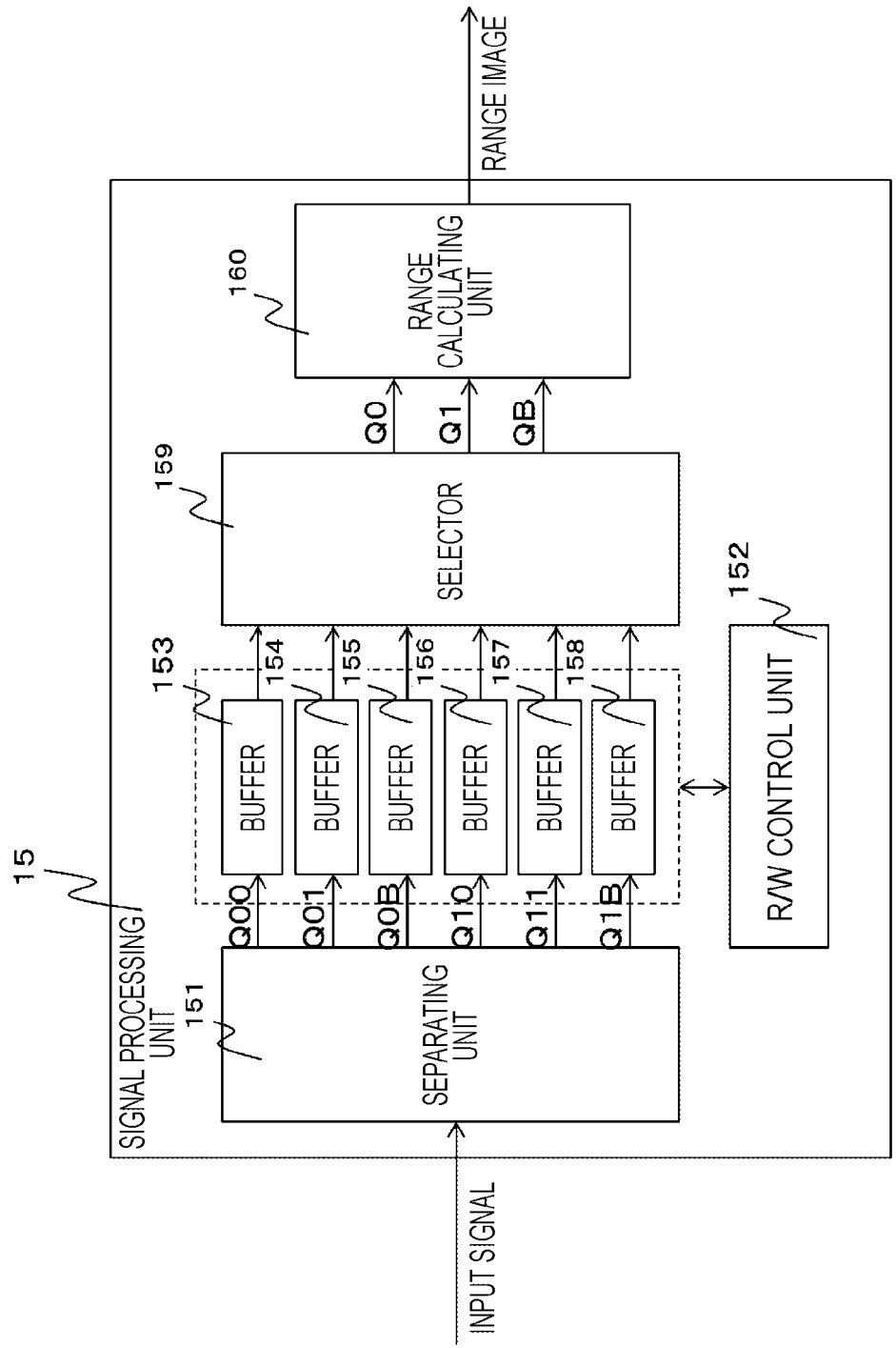
FIG. 2 is a diagram showing an example of a detailed configuration of a signal processing unit according to first and second embodiments of the present invention.

FIG. 2 is a diagram showing an example of a detailed configuration of the signal processing unit 15. The signal processing unit 15 includes a separating unit 151, an R/W control unit 152, buffers 153 to 158, a selector 159, and a range calculating unit 160.

The separating unit 151 is a functional unit that separates input signals. Specifically, the separating unit 151 separates the input signals indicating the light exposure amount acquired from the light receiving unit 14 for each predetermined light emission intensity and light emission light exposure pattern with reference to the signal related information.

The R/W control unit 152 is a functional unit that stores (writes) each of the input signals separated by the separating unit 151 into the respective buffers 153 to 158 and takes out (reads) the signals from the respective buffers 153 to 158.

The buffers 153 to 158 store each of the input signals separated by the separating unit 151.

The selector 159 selects the input signal (read out) taken out from the buffers 153 to 158 depending on a predetermined reference and outputs the selected input signal to the range calculating unit 160.

The range calculating unit 160 is a functional unit that calculates a range from the range image generation apparatus 100 to the object OB for each pixel using the signal output from the selector 159. Details of a process by the range calculating unit 160 will be described below.

The schematic configuration of the range image generation apparatus 100 according to the present embodiment has been described hereinabove.

Figure 3:
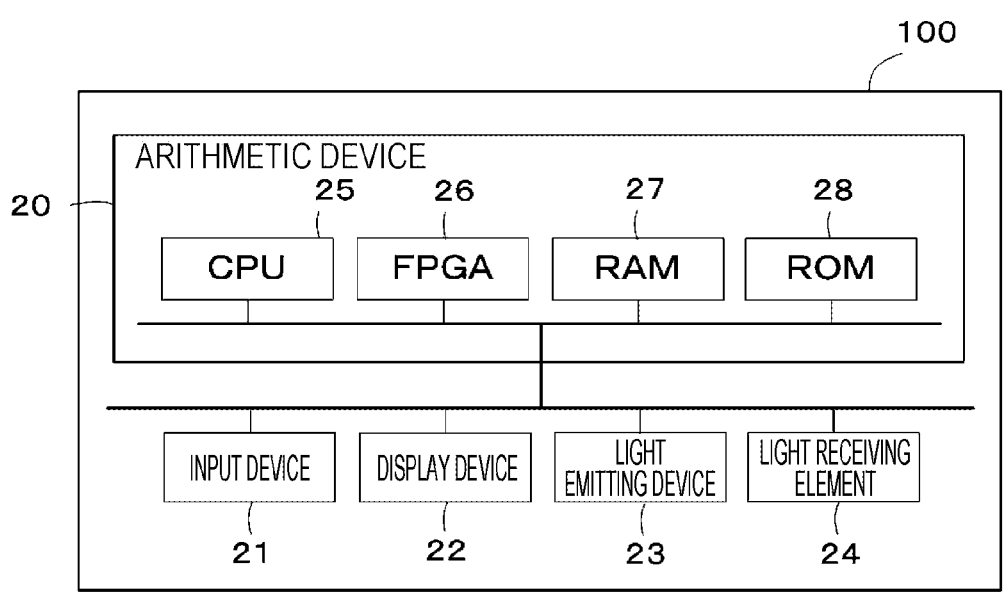
FIG. 3 is a diagram showing an example of a hardware configuration of the range image generation apparatus according to the first embodiment of the present invention.

FIG. 3 is a diagram showing an example of a hardware configuration of the range image generation apparatus 100. The range image generation apparatus 100 is realized by, for example, a range image sensing camera (so-called, a TOF camera) that can measure a range in a depth direction for each pixel depending on a reflection time of the near infrared light with which the object OB is irradiated.

As shown, the range image generation apparatus 100 includes an arithmetic device 20, an input device 21, a display device 22, a light emitting device 23, and a light receiving element 24.

The arithmetic device 20 is a central unit that executes various processes of the range image generation apparatus 100, and includes a central processing unit (CPU) 25 and a field programmable gate array (FPGA) 26 that perform an arithmetic process and a random access memory (RAM) 27 and a read only memory (ROM) 28 as main memory units.

The input device 21 is a device that receives setting of an image capturing mode or an image capturing instruction from the user of the range image generation apparatus 100, and is, for example, a touch panel or a dial button.

The display device 22 is a device that displays setting information, menu information, or the like of the range image generation apparatus 100, and is, for example, a liquid crystal display.

The light emitting device 23 is a device that emits the near infrared light toward the object OB, and is an electronic flash (strobe) device.

The light receiving element 24 is an electronic element (image capturing element) that converts light and darkness of light into an electric signal, and is, for example, a charge-coupled device (CCD) image sensor or a complementary metal oxide semiconductor (CMOS) image sensor.

The control unit 12 and the signal processing unit 15 of the range image generation apparatus 100 are realized by a predetermined program that causes the FPGA 26 (or the CPU 25) to perform the processes. Such a program is stored in the RAM 27 or the ROM 28, is loaded on the RAM 27 for execution, and is executed by the FPGA (or the CPU 25). In addition, the light emitting unit 13 is realized by the light emitting device 23. In addition, the light receiving unit 14 is realized by the light receiving element 24.

The hardware configuration of the range image generation apparatus 100 according to the present embodiment has been described hereinabove.

Figure 4:
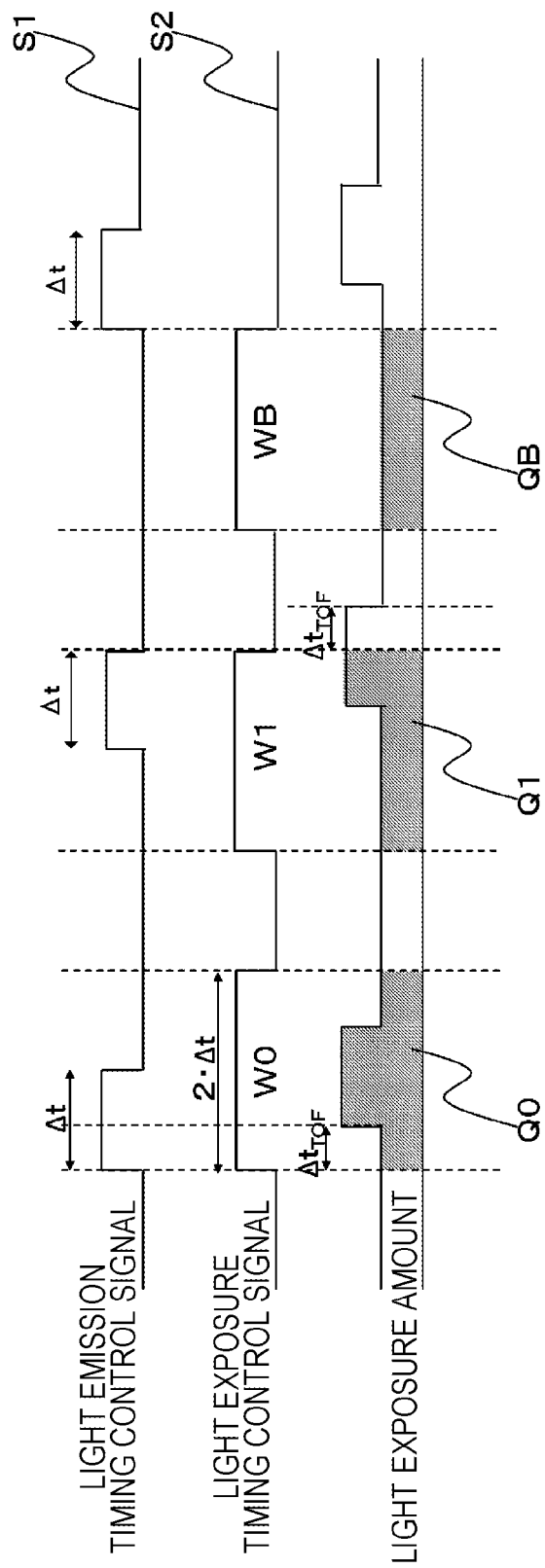
FIG. 4 is a diagram showing an example of a timing chart of a light emission timing control signal S1 and a light exposure timing control signal S2 according to the first and second embodiments of the present invention.

FIG. 4 is a diagram showing an example of a timing chart of the light emission timing control signal S1 and the light exposure timing control signal S2. As shown, the light emission timing control signal S1 and the light exposure timing control signal S2 include three types of light emission light exposure patterns.

As shown, the three types of light emission light exposure patterns are an entire light exposure period W0, a range measurement period W1, and a background light measurement period WB. The entire light exposure period W0 is a period in which light exposure is performed at a timing at which all of the reflected light of the light emitted from the light emitting unit 13 to the object OB can be received.

The control unit 12 sets a pulse width of the light emission timing control signal S1 to $\Delta t$ and sets a pulse width of the light exposure timing control signal S2 to $2\Delta t$ which is twice $\Delta t$. In addition, the control unit 12 synchronizes rising timings of the light emission timing control signal S1 and the light exposure timing control signal S2 with each other. The control unit 12 sets a time length of the entire light exposure period W0 to $2\Delta t$. Therefore, it is possible to set the entire light exposure period W0 in which all of the reflected light from the object OB can be exposed, in synchronization with the irradiation with the near infrared light by the light emitting unit 13.

It is necessary to increase a set value of $\Delta t$ in proportion to a measurement range to the object OB to be measured. For this reason, the control unit 12 specifies the measurement range based on setting information of the image capturing mode, and determines a predetermined value corresponding to the measurement range as $\Delta t$.

The range measurement period W1 is a period in which light exposure is performed at such a timing that a light reception amount is decreased as the reflected light is delayed with respect to the light emission timing. In the range measurement period W1, the control unit 12 synchronizes falling timings of the light emission timing control signal S1 and the light exposure timing control signal S2 with each other. The control unit 12 sets a time length of the range measurement period W1 to $2\Delta t$, similarly to the entire light exposure period W0. Therefore, it is possible to set the range measurement period W1 in which the light exposure amount is decreased as the reflected light from the object OB is delayed, in synchronization with the irradiation with the near infrared light by the light emitting unit 13.

The background light measurement period WB is a period in which the light exposure is performed at such a timing that only background light other than the reflected light from the object OB is received. In the background light measurement period WB, the control unit 12 synchronizes a rising timing of the light emission timing control signal S1 and a fall timing of the light exposure timing control signal S2 with each other. The control unit 12 sets a time length of the background light measurement period WB to $2\Delta t$, similarly to the entire light exposure period W0. Therefore, it is possible to set the background light measurement period WB in which only the background light that does not include the reflected light is exposed.

With the light emission light exposure patterns as described above, the range image generation apparatus 100 can obtain three types of light exposure amounts Q0, Q1, and QB for each pixel of the captured image of the object OB.

It should be noted that $\Delta tTOF$ is a time (second) from when the light emitting unit 13 emits the near infrared light until the light receiving unit 14 receives the reflected light reflected by the object OB. Here, since the range to the object OB is in proportion to a delay time of the reflected light, the range to the object OB is obtained by a ratio between the light exposure amount Q0 in the entire light exposure period W0 and the light exposure amount Q1 in the range measurement period W1. However, in either case, since the background light is included, it is necessary to cancel the background light using the light exposure amount QB of such a period. Therefore, the range calculating unit 160 calculates a value of $\Delta tTOF$ using the following Equation (1).

$$\Delta tTOF = \Delta t \times \{1-(Q1-QB)\}/(Q0-QB) \qquad (1)$$

In addition, $\Delta tTOF$ is a round trip time from the light emitting unit 13 to the object OB. Therefore, the range calculating unit 160 calculates the range L(m) to the object OB using the following Equation (2). It should be noted that c is the speed of light and a unit of c is (m/sec).

$$L=(c\times\Delta tTOF)/2=(c\times\Delta t)/2\times\{1-(Q1-QB)/(Q0-QB)\} \quad (2)$$

Conditions of both of the above Equations (1) and (2) are that the light exposure amounts Q0 and Q1 are not saturated. Since the light exposure amount Q1 is a light exposure amount decreased in proportion to the delay time of the reflected light, Q0>Q1. Therefore, when a control is performed so that the light exposure amount Q0 is not saturated, it is possible to create a condition that neither of the light exposure amounts Q0 nor Q1 is saturated.

In the present embodiment, in order to obtain a light exposure amount that is not saturated, measurement is performed by changing a light emission intensity of the near infrared light emitted from the light emitting unit 13. Details of this measurement will be described below.

[Description of Operation]

Figure 5:
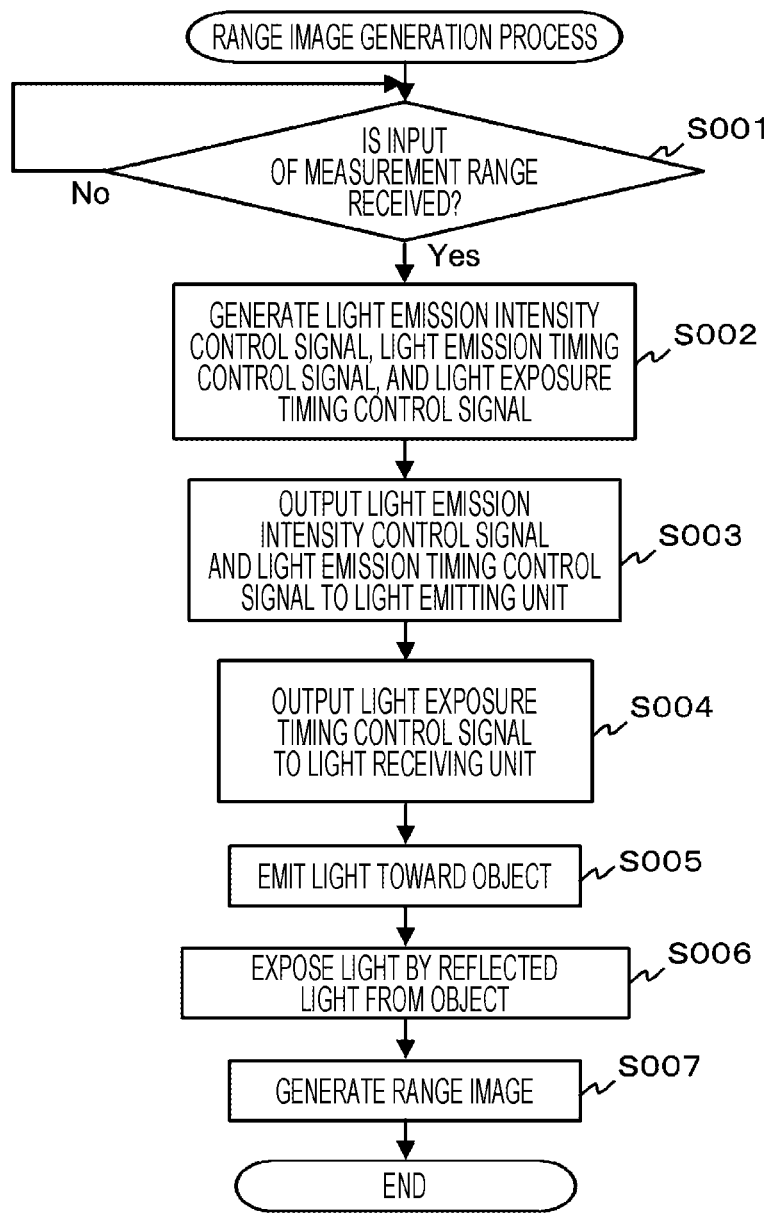
FIG. 5 is a flowchart showing an example of a flow of a range image generation process executed by the range image generation apparatus according to the first embodiment of the present invention.

FIG. 5 is a flowchart showing an example of a flow of a range image generation process executed by the range image generation apparatus 100. The range image generation process starts with, for example, start-up of the range image generation apparatus 100.

When the range image generation process starts, the input receiving unit 11 monitors whether or not a setting input of the image capturing mode related to the measurement range from the range image generation apparatus 100 to the object OB has been received from the user (step S001). When it is determined that the setting input has been received (Yes in step S001), the input receiving unit 11 outputs the measurement range corresponding to the set image capturing mode to the control unit 12.

Then, the control unit 12 generates a light emission intensity control signal S0, a light emission timing control signal S1, and a light exposure timing control signal S2 depending on the measurement range (step S002). Specifically, the control unit 12 generates a light emission intensity control signal S0, a light emission timing control signal S1, and a light exposure timing control signal S2 shown in FIG. 6.

Figure 6:
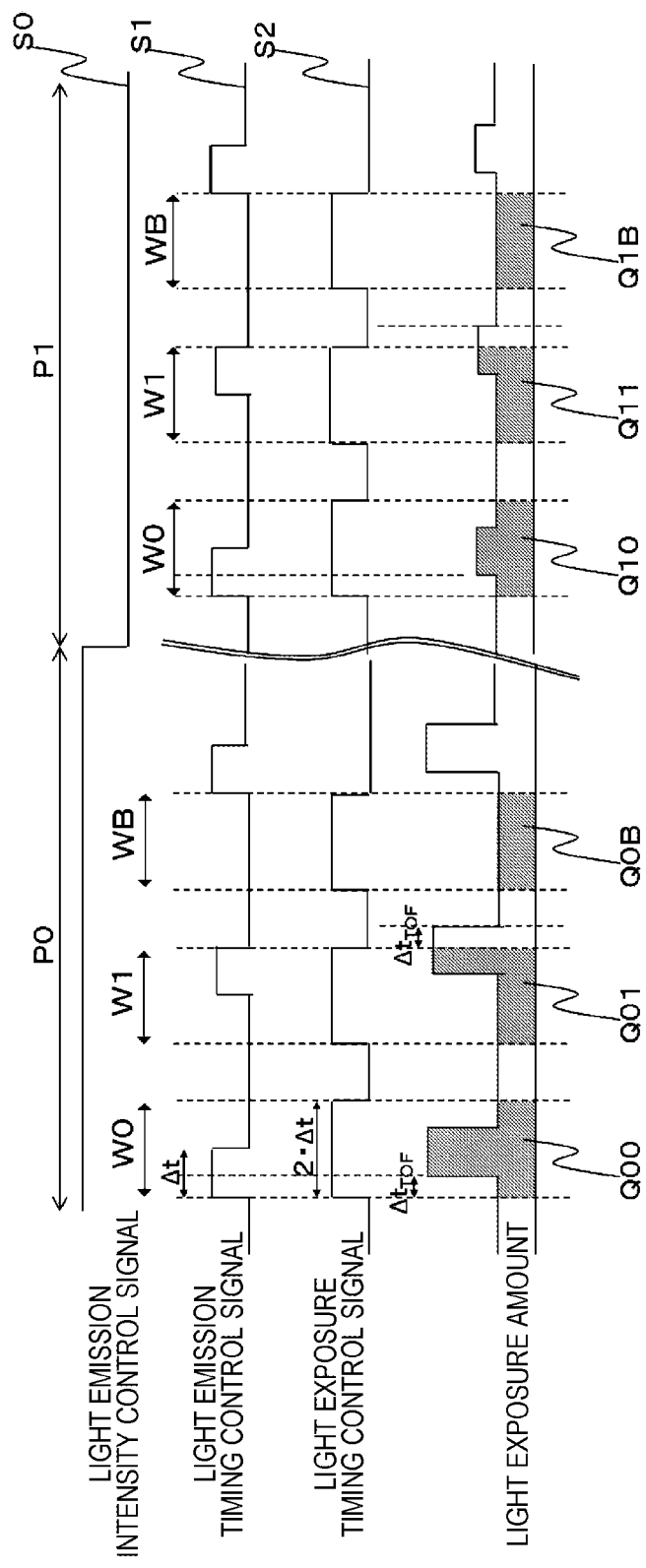
FIG. 6 is a diagram showing an example of a timing chart of a light emission intensity control signal S0, a light emission timing control signal S1, and a light exposure timing control signal S2 according to the first embodiment of the present invention.

FIG. 6 is a diagram showing an example of a timing chart of the light emission intensity control signal S0, the light emission timing control signal S1, and the light exposure timing control signal S2. As shown, the light emission intensity control signal S0 has periods P0 and P1 of two types of different light emission intensities, and each of the periods P0 and P1 includes three types of light emission light exposure patterns. It should be noted that details of the light emission light exposure patterns are the same as those described above, and a description thereof is thus omitted.

The control unit 12 generates two types of light emission intensity control signals S0 having different emission intensities. Specifically, the control unit 12 sets each of time lengths of the periods P0 and P1 including a light emission intensity period P0 of strong light emission and a light emission intensity period P1 of weak light emission, to a length including the three types of light emission light exposure patterns described above. In other words, the control unit 12 generates the light emission intensity control signal S0, the light emission timing control signal S1, and the light exposure timing control signal S2 so that the light emission light exposure patterns of the light emission timing control signal S1 and the light exposure timing control signal S2 are included in each of the strong light emission period P0 and the weak light emission period P1.

Then, the control unit 12 outputs the generated light emission intensity control signal S0 and light emission timing control signal S1 to the light emitting unit 13 (step S003), and outputs the light exposure timing control signal S2 to the light receiving unit 14 (step S004). In addition, the control unit 12 generates signal related information, and outputs the signal related information to the signal processing unit 15.

Then, the light emitting unit 14 irradiates the object OB with the near infrared light at a light emission timing and a light emission intensity indicated by the light emission timing control signal S1 and the light emission intensity control signal S0 (step S005). In addition, the light receiving unit 14 receives the reflected light from the object OB at a timing indicated by the light exposure timing control signal S2 to perform light exposure (step S006).

Therefore, the light receiving unit 14 obtains light exposure amounts Q00, Q01, and Q0B for each pixel of the captured image of the object OB in the strong light emission period P0. In addition, the light receiving unit 14 obtains light exposure amounts Q10, Q11, and Q1B in the weak light emission period P1. In addition, the light receiving unit 14 converts the light exposure amounts into electrical signals by photoelectric conversion, and outputs the converted electrical signals to the signal processing unit 15. Therefore, the light exposure amounts obtained depending on the timing chart of FIG. 6 are output to the signal processing unit 15 in a time division manner using the same signal line.

Then, the signal processing unit 15 generates a range image using the input signal (step S007). Specifically, the separating unit 151 of the signal processing unit 15 separates the input signals indicating the light exposure amounts for each light emission intensity and light emission light exposure pattern with reference to the signal related information. In addition, the R/W control unit 152 writes the signals separated by the separating unit 151 into the buffers 153 to 158, respectively. For example, the R/W control unit 152 writes the signals indicating the light exposure amounts Q00, Q01, Q0B, Q10, Q11, and Q1B into the buffers 153 to 158, respectively.

Next, the R/W control unit 152 reads the signal indicating the light exposure amount from each of the buffers 153 to 158 at a predetermined timing, and inputs the signal to the selector 159. The selector 159 selects an input signal of a light exposure amount that is not saturated, and outputs the selected input signal to the range calculating unit 160.

Specifically, the selector 159 determines whether or not the light exposure amount Q00 of the entire light exposure period W0 included in the strong light emission period P0 is an a predetermined saturation value QS or more, for each pixel. The selector 159 selects signals indicating the light exposure amounts Q10, Q11, and Q1B obtained in each period of the light emission light exposure patterns included in the weak light emission period P1 for pixels of which the value of Q00 is equal to or more than the value of QS, and outputs the selected signals to the range calculating unit 160.

On the other hand, the selector 159 selects signals indicating the light exposure amounts Q00, Q01, and Q0B obtained in each period of the light emission light exposure patterns included in the strong light emission period P0 for pixels of which the value of Q00 is less than the value of QS, and outputs the selected signals to the range calculating unit 160.

The range calculating unit 160 calculates a range from the range image generation apparatus 100 to the object OB for each pixel using the input signal acquired from the selector 159. Specifically, when the signals indicating the light exposure amounts of the weak light emission period P1 are selected by the selector 159, the range calculating unit 160 calculates the range L(m) to the object OB by the following Equation (3) using the values of Q10, Q11, and Q1B.

$$L=(c \times \Delta t)/2 \times \{1-(Q11-Q1B)/(Q10-Q1B)\} \quad (3)$$

On the other hand, when the signals indicating the light exposure amounts of the strong light emission period P0 are selected by the selector 159, the range calculating unit 160 calculates the range L(m) to the object OB for each pixel by the following Equation (4) using the values of Q00, Q01, and Q0B.

$$L=(c \times \Delta t)/2 \times \{1-(Q01-Q0B)/(Q00-Q0B)\} \quad (4)$$

In this manner, the range calculating unit 160 calculates the range from the range image generation apparatus 100 to the object OB for each pixel of the captured image of the object OB.

Next, an example of generation of a range image will be described with reference to FIGS. 7 to 9.

Figure 7:
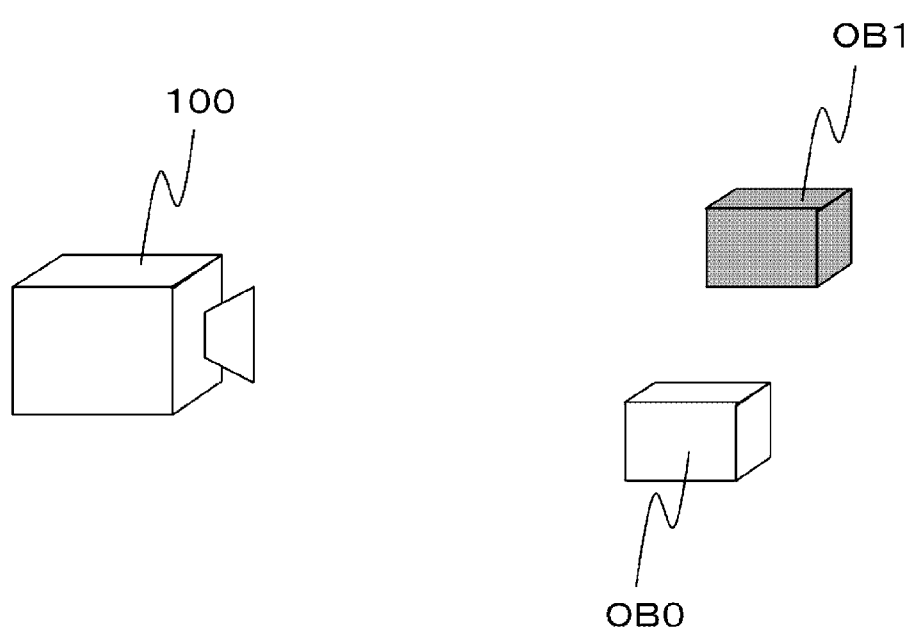
FIG. 7 is a diagram showing an example of an image capturing configuration including the range image generation apparatus, an object OB0, and an object OB1 according to the first embodiment of the present invention.

FIG. 7 is a diagram showing an example of an image capturing configuration including the range image generation apparatus 100, an object OB0, and an object OB1.

Figure 8:
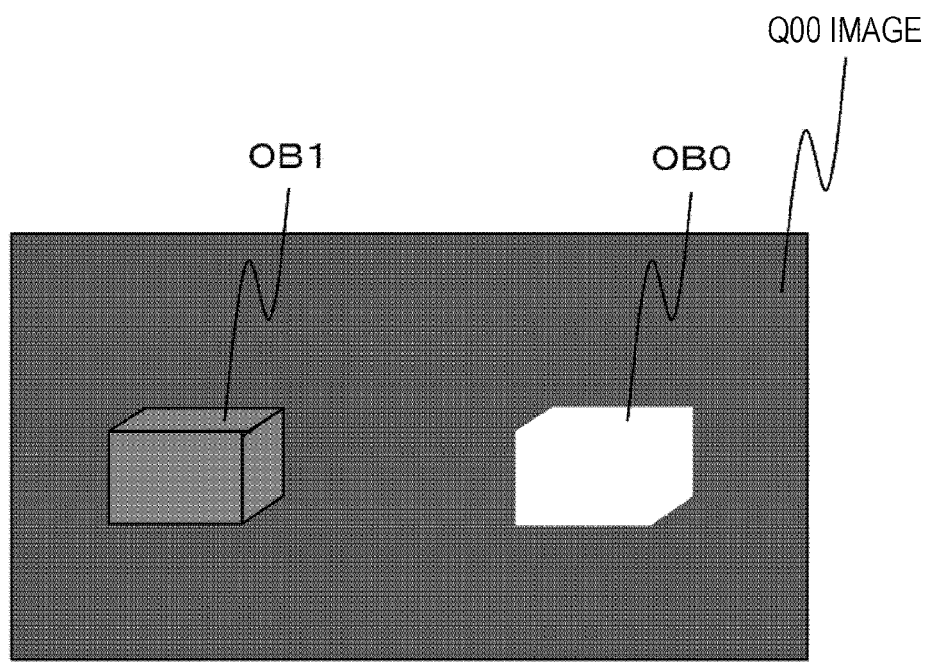
FIG. 8 is a diagram showing an example of an image in which light exposure amounts Q00 of the objects OB0 and OB1 image-captured in a strong light emission period P0 according to the first embodiment of the present invention are two-dimensionally arranged.

FIG. 8 is a diagram showing an example of an image (hereinafter, referred to as a Q00 image) in which light exposure amounts Q00 of the objects OB0 and OB1 image-captured in the strong light emission period P0 are two-dimensionally arranged.

Figure 9:
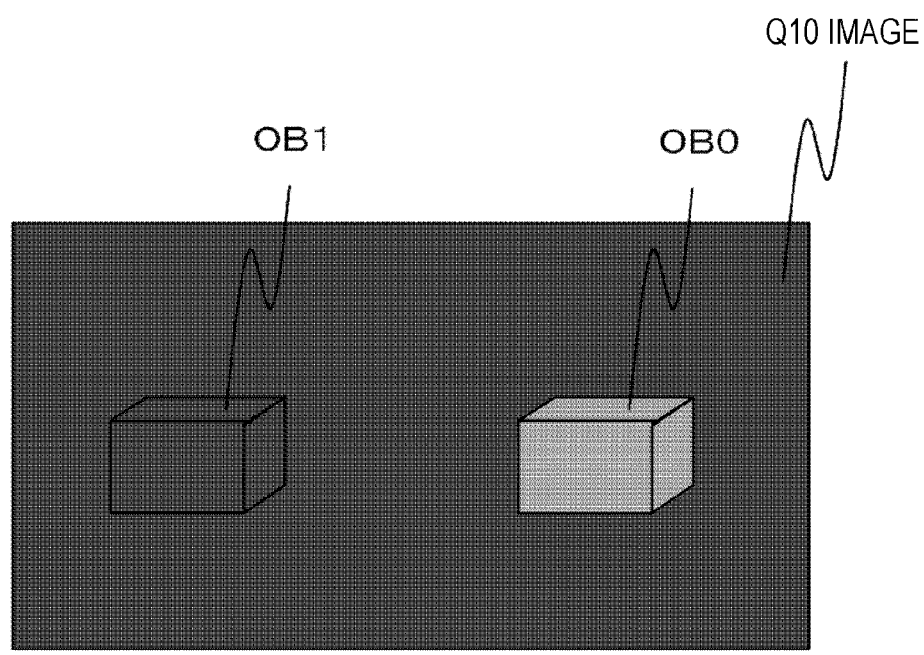
FIG. 9 is a diagram showing an example of an image in which light exposure amounts Q10 of the objects OB0 and OB1 image-captured in a weak light emission period P1 according to the first embodiment of the present invention are two-dimensionally arranged.

FIG. 9 is a diagram showing an example of an image (hereinafter, referred to as a Q10 image) in which light exposure amounts Q10 of the objects OB0 and OB1 image-captured in the weak light emission period P1 are two-dimensionally arranged.

It should be noted that the object OB0 indicates an object of which a surface has a high light reflectivity (for example, an object of which a surface is formed of a white material or a material having gloss). In addition, the object OB1 indicates an object of which a surface has a low light reflectivity (for example, an object of which a surface is formed of a black material or a material that does not have gloss).

As shown in FIG. 8, in the Q00 image in the strong light emission period P0, a light exposure amount of the object OB0 is saturated, such that it is impossible to calculate an accurate range from the range image apparatus to the object OB0. On the other hand, even in the Q00 image in the strong light emission period P0, a light exposure amount of the object OB1 is not saturated, and an accurate range can thus be calculated.

In addition, as shown in FIG. 9, in the Q10 image in the weak light emission period P1, light exposure amounts of either of the objects OB0 and OB1 are not saturated. However, the object OB1 appears very dark, such that a signal to noise (S/N) ratio of a signal is decreased due to shot noise or quantization at the time of analog to digital (A/D) conversion in the light receiving unit 14, which can cause an error in range calculation.

Therefore, the range image generation apparatus 100 calculates the range to the object using the light exposure amounts of the weak light emission period P1 for the pixels of which the light exposure amounts of the image-captured object are saturated and using the light exposure amounts of the strong light emission period P0 for the pixels of which the light exposure amounts of the image-captured object are not saturated, by the range image generation process described above. In other words, the range image generation apparatus 100 can accurately calculate the range to the object by replacing the pixels saturated in the Q00 image by the light exposure amounts of the corresponding pixels in the Q10 image.

As described above, the range image generation apparatus 100 can generate the range image with higher accuracy. In particular, the range image generation apparatus 100 captures the image of the object at two types of different light emission intensities, and replaces the pixels of which the light exposure amounts are saturated by the light exposure amounts (range information) of the pixels that are not saturated to generate the range image. Therefore, the range image can be generated using measurement information that does not include saturation of the light exposure amounts or signal noise as much as possible.

Second Embodiment

Figure 10:
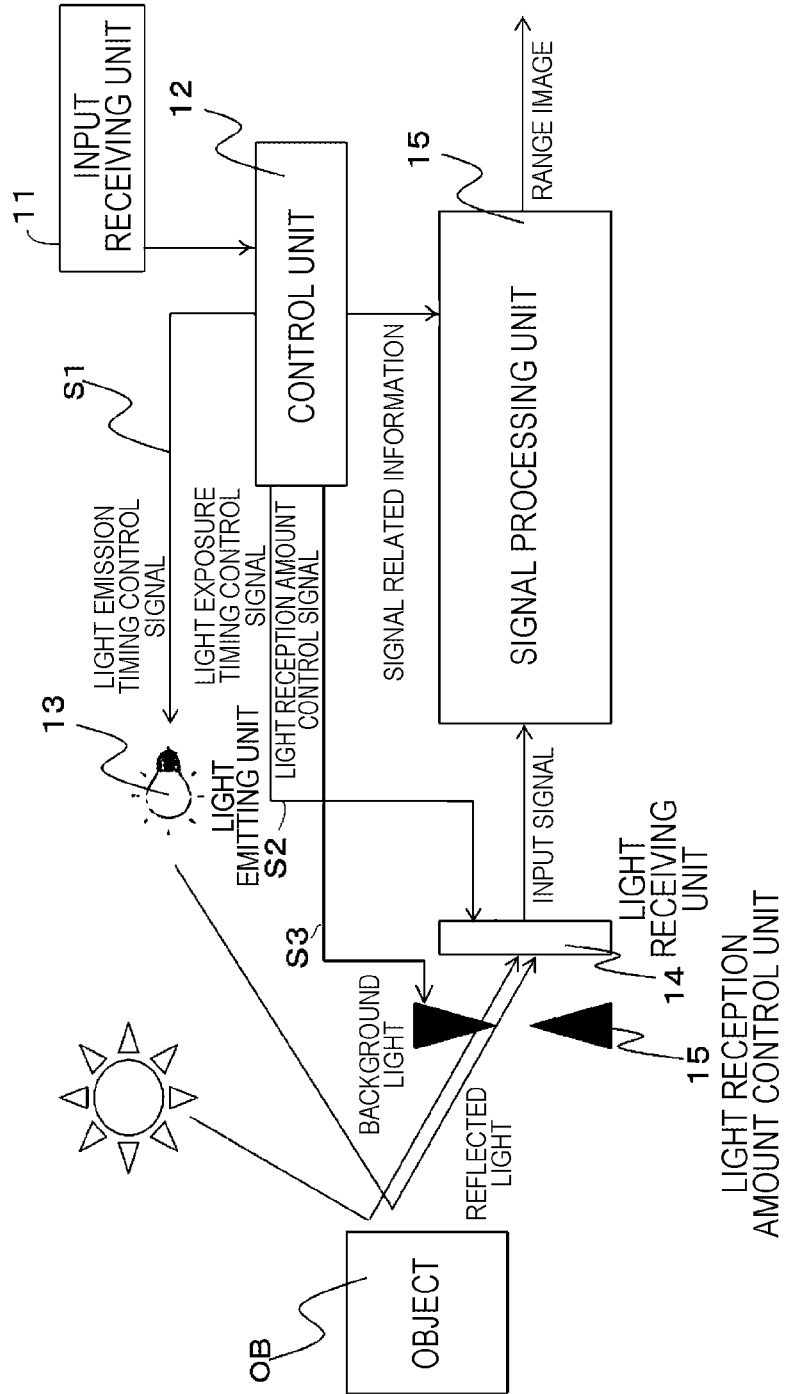
FIG. 10 is a diagram showing an example of a schematic configuration of a range image generation apparatus according to a second embodiment of the present invention.

FIG. 10 is a diagram showing an example of a schematic configuration of a range image generation apparatus 100 according to a second embodiment. The range image generation apparatus 100 according to the present embodiment is different from the range image generation apparatus according to the first embodiment in that it includes a light reception amount control unit 16. The light reception amount control unit 16 changes a light reception amount of a light receiving unit 14 based on a light reception amount control signal S3 generated by a control unit 12. It should be noted that since basic components of the range image generation apparatus 100 are the same as those of the range image generation apparatus according to the first embodiment, the basic components are denoted by the same reference numerals and a description thereof is omitted.

The light reception amount control unit 1612 is realized by, for example, a device such as an iris or a liquid crystal shutter. The light reception amount control unit 16 changes a value of the iris based on the light reception amount control signal S3 output from the control unit 12, and adjusts an amount of light received by the light receiving unit 14. Therefore, it is possible to change a light amount, that is, a light exposure amount, of reflected light from an object OB received by the light receiving unit 14.

The control unit 12 generates a light emission timing control signal S1, a light exposure timing control signal S2, and the light reception amount control signal S3. The light reception amount control signal S3 is a signal for controlling a value of the iris by the light reception amount control unit 16. It should be noted that the light emission timing control signal S1 and the light exposure timing control signal S2 are the same as those described above, and a description thereof is thus omitted.

Figure 11:
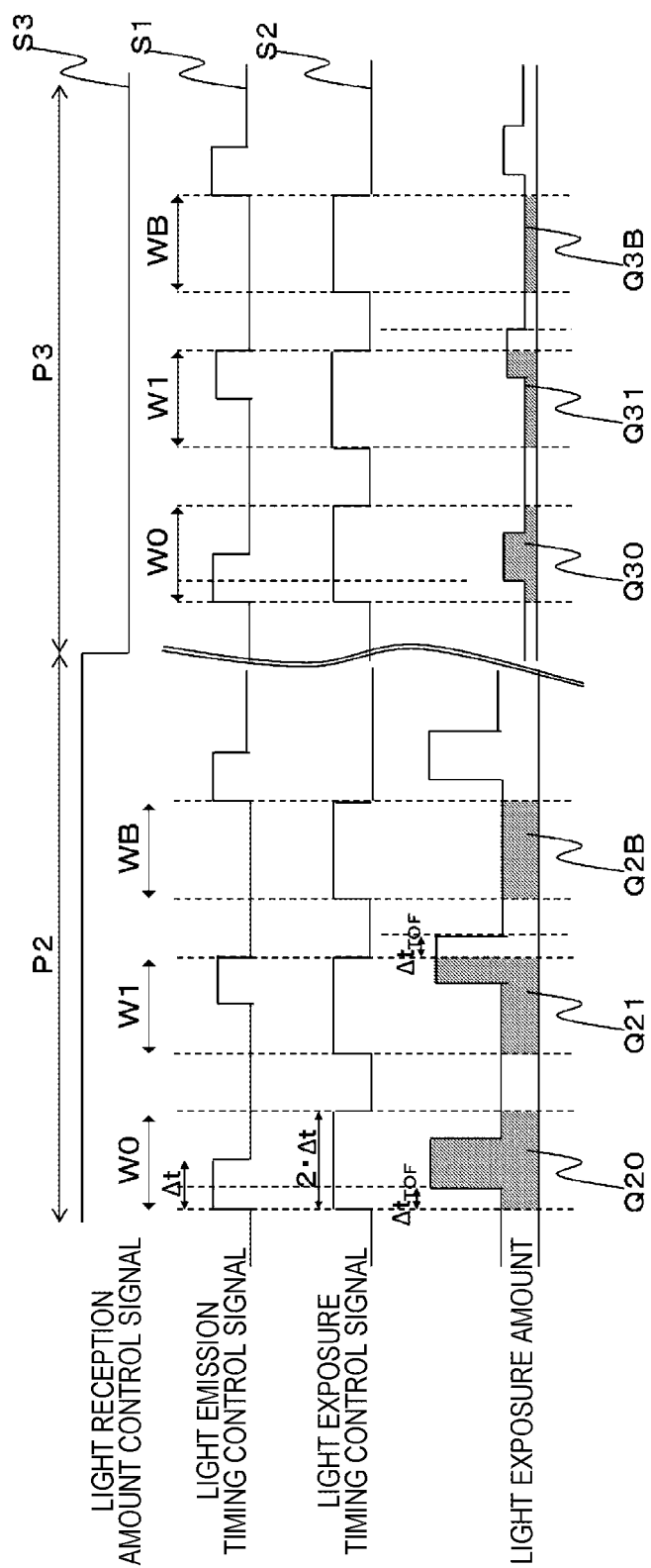
FIG. 11 is a diagram showing an example of a timing chart of a light emission timing control signal S1, a light exposure timing control signal S2, and a light reception amount control signal S3 according to the second embodiment of the present invention.

FIG. 11 is a diagram showing an example of a timing chart of the light emission timing control signal S1, the light exposure timing control signal S2, and the light reception amount control signal S3. As shown, the light reception amount control signal S3 has periods P2 and P3 of two kinds of different light reception amounts (strong light amount and weak light amount). In addition, each of the periods P2 and P3 includes three types of light emission light exposure patterns described in the first embodiment.

The control unit 12 generates the light reception amount control signal S3 including a strong light amount period P2 and a weak light amount period P3 set to time lengths in which the light emission light exposure patterns are included. In addition, the control unit 12 outputs the light reception amount control signal S3 to the light reception amount control unit 16 at a predetermined timing.

The light reception amount control unit 16 controls the value of the iris based on the light reception amount control signal S3, and controls the light reception amount of the light receiving unit 14. As in the first embodiment, the control unit 12 outputs the light emission timing control signal S1 to the light emitting unit 13 and outputs the light exposure timing control signal S2 to the light receiving unit 14, at a predetermined timing. In addition, the control unit 12 generates signal related information on the light emission timing control signal S1, the light exposure timing control signal S2, and the light reception amount control signal S3, and outputs the signal related information to a signal processing unit 15.

The light emitting unit 13 irradiates the object OB with near infrared light based on the light emission timing control signal S1. The light reception amount control unit 1612 changes the value of the iris based on the light reception amount control signal S3. The light receiving unit 14 performs light exposure by reflected light that is reflected on the object OB and returns. Therefore, the light receiving unit 14 obtains light exposure amounts Q20, Q21, and Q2B for each pixel of a captured image of the object OB in the strong light amount period P2. In addition, the light receiving unit 14 obtains light exposure amounts Q30, Q31, and Q3B in the weak light amount period P3. In addition, the light receiving unit 14 converts the light exposure amounts into electrical signals by photoelectric conversion, and outputs the converted electrical signals to the signal processing unit 15.

The signal processing unit 15 generates a range image using an input signal, as described above. Specifically, a separating unit 151 of the signal processing unit 15 separates input signals indicating the light exposure amounts for each light reception amount and light emission light exposure pattern with reference to the signal related information. In addition, an R/W control unit 152 writes the signals separated by the separating unit 151 into predetermined buffers 153 to 158, respectively.

Next, the R/W control unit 152 reads the signal indicating the light exposure amount from each of the buffers 153 to 158 at a predetermined timing, and inputs the signal to a selector 159. The selector 159 selects an input signal of a light exposure amount that is not saturated, and outputs the selected input signal to a range calculating unit 160.

Specifically, the selector 159 determines whether or not the light exposure amount Q20 of an entire light exposure period W0 included in the strong light amount period P2 is an a predetermined saturation value QS or more, for each pixel. The selector 159 selects signals indicating the light exposure amounts Q30, Q31, and Q3B obtained in each period of the light emission light exposure patterns included in the weak light amount period P3 for pixels of which the value of Q20 is equal to or more than the value of QS, and outputs the selected signals to the range calculating unit 160.

On the other hand, the selector 159 selects signals indicating the light exposure amounts Q20, Q21, and Q2B obtained in each period of the light emission light exposure patterns included in the strong light amount period P2 for pixels of which the value of Q20 is less than the value of QS, and outputs the selected signals to the range calculating unit 160.

The range calculating unit 160 calculates a range from the range image generation apparatus 100 to the object OB for each pixel using the input signal acquired from the selector 159. Specifically, when the signals indicating the light exposure amounts of the weak light amount period P3 are selected by the selector 159, the range calculating unit 160 calculates the range L(m) to the object OB by the following Equation (5) using the values of Q30, Q31, and Q3B.

$$L=(c \times \Delta t)/2 \times \{1-(Q31-Q3B)/(Q30-Q3B)\} \quad (5)$$

On the other hand, when the signals indicating the light exposure amounts of the strong light amount period P2 are selected by the selector 159, the range calculating unit 160 calculates the range L(m) to the object OB for each pixel by the following Equation (6) using the values of Q20, Q21, and Q2B.

$$L=(c \times \Delta t)/2 \times \{1-(Q21-Q2B)/(Q20-Q2B)\} \quad (6)$$

The range image generation apparatus 100 according to the second embodiment has been described hereinabove. The range image generation apparatus 100 as described above can also generate the range image with higher accuracy. In particular, for example, even in the case where it is difficult to control a light emission amount due to a restriction or the like of a light source side, the range image generation apparatus 100 according to the present embodiment can provide a range image with high accuracy by adding simple hardware (iris or liquid crystal shutter).

The generated range image is used for analysis (for example, human flow analysis or analysis of a worker's work in a factory) of three-dimensional recognition such as identification of a depth direction of the object.

The respective functional units of the range image generation apparatus 100 described above are classified depending on main processing contents in order to make the functions of the range image generation apparatus 100 realized in the present embodiment easy to understand, and the present invention is not limited by a method of classifying the respective functions and names of the respective functions. In addition, the respective components of the range image generation apparatus 100 can also be classified into more components depending on processing contents. In addition, one component can also be classified so as to execute more processes.

In addition, the present invention is not limited to the abovementioned embodiments, but includes various modified examples. For example, the abovementioned embodiments have been described in detail in order to explain the present invention in an easy-to-understand manner, and are not necessarily limited to including all the components described. In addition, some of the components of any embodiment can be replaced by components of another embodiment, and components of another embodiment can be added to components of any embodiment. In addition, it is possible to add, delete, and replace other components with respect to some of the components of the respective embodiments.

In the above description, control lines or information lines considered to be necessary for the description are shown, and all control lines or information lines are not necessarily shown for a product. In fact, it may be considered that almost all the components are connected to each other.

REFERENCE SIGNS LIST 100 range image generation apparatus
11 input receiving unit
12 control unit
13 light emitting unit
14 light receiving unit
15 signal processing unit
151 separating unit
152 R/W control unit
153 to 158 buffer
159 selector
160 range calculating unit
20 arithmetic device 21 input device
22 display device
23 light emitting device
24 light receiving element

The invention claimed is:

1. A range image generation apparatus comprising:
a light emitting unit that emits light toward an object at a plurality of different light emission intensities;
a light receiving unit that captures an image of the object by receiving light including reflected light from the object and calculates a light exposure amount for each pixel of a plurality of pixels;
a field programmable gate array that separates a plurality of input signals with reference to signal related information, the field programmable gate array comprising a range calculating unit, the range calculation unit configured to
calculate an amount of time from when the light emitting unit emits light until the light receiving unit receives the light using the plurality of input signals to determine a light exposure amount at a first light emission intensity, a second light exposure amount at a second light emission intensity, a third light exposure amount at a third light emission intensity and a predetermined value
on a condition that one of the plurality of light exposure amounts for one of the plurality of pixels is saturated, replace the one of the plurality of light exposure amounts with corresponding a light exposure amount of a different pixel from a different image,
calculates a range to the object using the calculated amount of time and the speed of light, and
generates a range image;
wherein the plurality of input signals indicate the light exposure amount for each of the plurality of different light emission intensities and each of the light exposure amounts, and
wherein the signal related information is data from the light exposure amount that is converted into electrical signals;
a control unit configured to output a light emission intensity control signal and a light emission timing control signal to the light emitting unit for each of the first light emission intensity and the second light emission intensity and a light exposure timing control signal to the light receiving unit for each of the first light emission intensity and the second light emission intensity; and
a light reception amount control unit that changes a light reception amount of the light receiving unit based on a light reception amount control signal output from the control unit.

2. The range image generation apparatus according to claim 1, wherein the light emitting unit emits the light toward the object at the first light emission intensity having a strong light emission intensity and the second light emission intensity having a light emission intensity weaker than the first light emission intensity.

3. The range image generation apparatus according to claim 1, wherein the light receiving unit exposes the light including the reflected light from the object at predetermined light exposure timings at which light exposure amounts are different from each other for each of the first light emission intensity and the second light emission intensity.

4. The range image generation apparatus according to claim 3, wherein the light exposure timings include a first timing at which all of the reflected light of the light emitted from the light emitting unit to the object is receivable, a second timing at which a light reception amount is decreased as the reflected light is delayed with respect to a light emission timing, and a third timing at which only background light other than the reflected light from the object is received.

5. The range image generation apparatus according to claim 4, wherein the range calculating unit calculates the range to the object for each pixel depending on a ratio between a light exposure amount of the light received at the first timing and a light exposure amount of the light received at the second timing.

6. The range image generation apparatus according to claim 1, wherein the range calculation unit calculates the amount of time using formula 1

$$\Delta t\text{TOF} = \Delta t1 - (Q1 - QB)/Q0 - QB \quad \text{formula 1}$$

where $\Delta t\text{TOF}$ is the amount of time, $\Delta t$ is the predetermined value, $Q0$ is the first light exposure amount, $Q1$ is the first light exposure amount and $QB$ is the first light exposure amount.

7. The range image generation apparatus according to claim 6, wherein the range calculation unit calculates the range to the object using formula 2

$$L = (C \times \Delta t\text{TOF})/2 \quad \text{formula 2}$$

where L is the range to the object and C is the speed of light.

8. A range image generation apparatus comprising:
a light emitting unit that emits light toward an object;
a light reception amount control unit that controls a light reception amount of light including reflected light from the object;
a light receiving unit that captures an image of the object by receiving the light controlled by the light reception amount control unit and calculates a light exposure amount for each pixel of a plurality of pixels;
a field programmable gate array that separates a plurality of input signals with reference to signal related information, the field programmable gate array comprising a range calculating unit, the range calculation unit configured to
calculates an amount of time from when the light emitting unit emits light until the light receiving unit receives the light using the plurality of input signals to determine a first light exposure amount when the light reception amount is controlled to be a first light reception amount, a second light exposure amount when the light reception amount is controlled to be a second light reception amount, a third light exposure amount when the light reception amount is controlled to be third light reception amount, and a predetermined value
on a condition that one of the plurality of light exposure amounts for one of the plurality of pixels is saturated, replace the one of the plurality of light exposure amounts with corresponding a light exposure amount of a different pixel from a different image,
calculates a range to the object using the calculated amount of time and the speed of light, and
generates a range image;
wherein the plurality of input signals indicate the light exposure amount for each of the plurality of different light emission intensities and each of the light exposure amounts, and wherein the signal related information is data from the light exposure amount that is converted into electrical signals;
a control unit configured to output a light emission intensity control signal and a light emission timing control signal to the light emitting unit and a light exposure timing control signal to the light receiving unit
a light reception amount control unit that changes the light reception amount of the light receiving unit based on a light reception amount control signal output from the control unit.

9. A range image generation method by a range image generation apparatus, comprising:
a light emitting step of receiving a light emission intensity control signal and a light emission timing control signal for each of a first light emission intensity and a second light emission intensity from a control unit and emitting light toward an object at different light emission intensities;
a light receiving step of receiving a light exposure timing control signal from the control unit for each of the first light emission intensity and the second light emission intensity and capturing an image of the object by receiving light including reflected light from the object and calculating a light exposure amount for each pixel of a plurality of pixels; and
a range image generating step including
separating a plurality of input signals with reference to signal related information,
calculating an amount of time from when the light emitting unit emits light until the light receiving unit receives the light using the plurality of input signals to determine a first light exposure amount of a pixel at a first light emission intensity, a second light exposure amount at the second light emission intensity, a third light exposure amount at a third light emission intensity, and a predetermined value,
on a condition that one of the plurality of light exposure amounts for one of the plurality of pixels is saturated, replacing the one of the plurality of light exposure amounts with corresponding a light exposure amount of a different pixel from a different image,
calculating a range to the object using the calculated amount of time and the speed of light, and
generating a range image,
wherein the plurality of input signals indicate the light exposure amount for each of the plurality of different light emission intensities and each of the light exposure amounts,
wherein the signal related information is data from the light exposure amount that is converted into electrical signals, and
changes, via a light reception amount control unit, a light reception amount of the light receiving unit based on a light reception amount control signal output.

10. A range image generation method by a range image generation apparatus, comprising:
a light emitting step of receiving a light emission intensity control signal and a light emission timing control signal from a control unit for each of a first light emission intensity and a second light emission intensity and emitting light toward an object;
a light reception amount controlling step of controlling a light reception amount of light including reflected light from the object and changes the light reception amount of a light receiving unit based on a light reception amount control signal output from the control unit;
a light receiving step of receiving a light exposure timing control signal from the control unit for each of the first light emission intensity and the second light emission intensity and capturing an image of the object by receiving the light controlled by the light reception amount controlling step and calculating a light exposure amount for each pixel of a plurality of pixels; and
a range image generating step comprising
separating a plurality of input signals with reference to signal related information, and
calculating an amount of time from when the light emitting unit emits light until the light receiving unit receives the light using the plurality of input signals to determine a first light exposure amount when the light reception amount is controlled to be a first light reception amount, a second light exposure amount when the light reception amount is controlled to be a second light reception amount, a third light exposure amount when the light reception amount is controlled to be third light reception amount, and a predetermined value
on a condition that one of the plurality of light exposure amounts for one of the plurality of pixels is saturated, replacing the one of the plurality of light exposure amounts with corresponding a light exposure amount of a different pixel from a different image,
calculating a range to the object using the calculated amount of time and the speed of light, generating a range image,
wherein the plurality of input signals indicate the light exposure amount for each of the plurality of different light emission intensities and each of the light exposure amounts, and
wherein the signal related information is data from the light exposure amount that is converted into electrical signals.

* * * * *